United States Patent [19]

Goodman

[11] 3,862,035
[45] Jan. 21, 1975

[54] DEVICE FOR DECREASING DEPOSITS IN LIQUID FILTERS

[76] Inventor: Geoffry Goodman, Kibbutz Amiad, Hevel Khorazim, Israel

[22] Filed: Mar. 5, 1973

[21] Appl. No.: 338,359

[30] Foreign Application Priority Data
Mar. 17, 1972 Israel.................................... 39008

[52] U.S. Cl................... 210/79, 210/308, 210/321, 210/409, 210/433
[51] Int. Cl............................................ B01d 35/22
[58] Field of Search .......... 210/137, 321, 409, 433, 210/79, 308

[56] References Cited
UNITED STATES PATENTS

| | | | |
|---|---|---|---|
| 3,109,809 | 11/1963 | Verrando, Jr................... | 210/409 X |
| 3,504,796 | 4/1970 | Bray................................... | 210/137 |
| 3,637,081 | 1/1972 | Bradley........................... | 210/433 X |

*Primary Examiner*—Frank A. Spear, Jr.
*Attorney, Agent, or Firm*—Molinare, Allegretti, Newitt & Witcoff

[57] ABSTRACT

In liquid filters for pipe lines in which a cylindrical filter body of perforated or meshed plastics or metal is inserted into a filter housing, the liquid in the line flowing from the inside through the body into the housing and from there into the line, the provision of pressure reducing means in communication with the filter body, said means having an outlet for the liquid at a substantially reduced pressure.

5 Claims, 4 Drawing Figures

PATENTED JAN 21 1975　　3,862,035
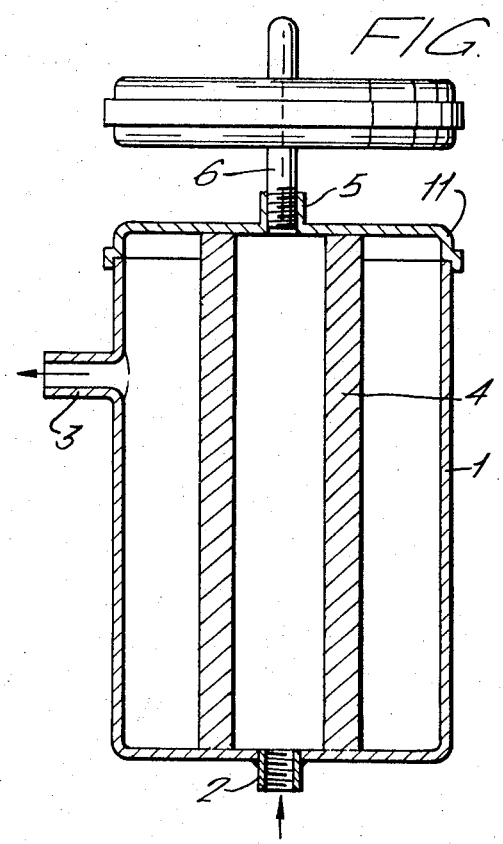
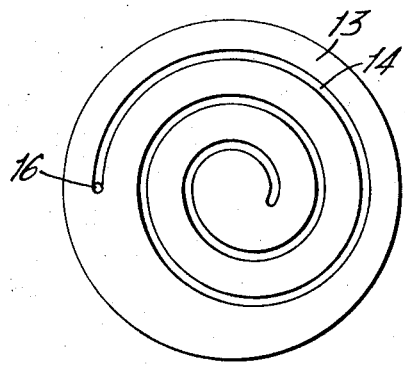
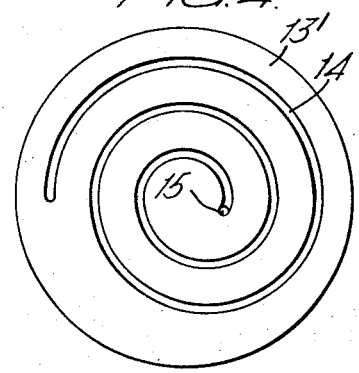
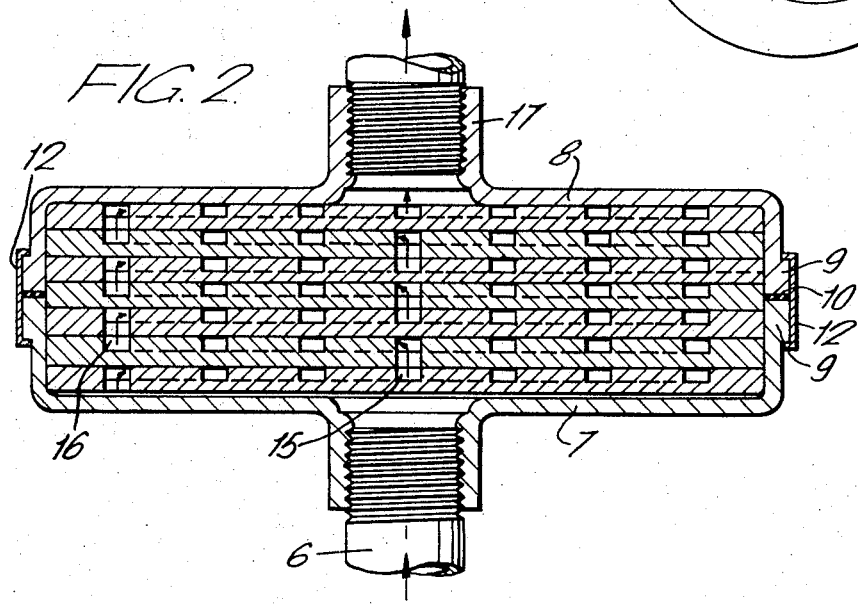

DEVICE FOR DECREASING DEPOSITS IN LIQUID FILTERS

The present invention concerns filters for liquid lines of the kind in which a cylindrical sleeve, called the filter body having walls of wire or plastic mesh or perforated metal with or without a finely porous liner is inserted into the filter housing in such a manner that the liquid must flow from the inside through the perforations of the sleeve before it can leave the filter housing. These filters will hereinafter be called filters of the kind defined.

The main drawbacks of filters of the kind defined is the fact that dirt and other solids carried by the water are eventually deposited on the wall of the filter body until the latter becomes clogged and prevents the water to flow therethrough. From the moment deposition starts, the increasing pressure loss and the force of the flow of the liquid to be filtered force a gradually increasing proportion of the deposited particles through the filter body.

The deposits generally form first at the downstream end of the cylinder. Thus, a solution to the clogging problem has been to connect a valve to this downstream end, so that by opening this valve periodically, the pressure of the incoming liquid will loosen the deposits from the wall of the cylinder and flush them out through the valve. In many cases this flushing out does not prevent a relatively rapid deposition on the walls of the filter body causing an increase in pressure loss and eventual blockage.

In another solution the filter body is removed from the housing and is cleaned by brushes or the like and then is again replaced.

This and other known solutions for cleaning the filter all necessitate to shut off the inflow into the filter periodically so that little liquid is lost while it is opened to remove the cylinder and clean it. However, in any case, the steady liquid flow through the filter is interrupted very frequently and in the first-mentioned solution large uncontrollable quantities of liquid are wasted in addition.

It is the object of the present invention to provide a means for preventing or minimizing the deposit of solids in a filter.

It is a further object of the present invention to provide means for continuously removing the deposits of solids which may accumulate on the cylinder of a filter, without either interrupting the flow of liquid through the line nor wasting great quantities of liquid.

The invention consists in a device for decreasing deposits in filters of the kind defined, comprising pressure reducing means in communication with the filter body, said means having an outlet for the liquid at a substantially reduced pressure.

In one embodiment of the invention, said pressure reducing means is constituted by a hydro cyclone.

In another preferred embodiment of the invention, said pressure reducing means is constituted by a housing its inlet being connected to the filter housing and having an outlet, in which housing one or more plates are stacked, said plates having a continuous groove at least on one of their faces and throughgoing holes in such a manner that an elongated pressure reducing groove is formed through the stack of plates through which part of the liquid must travel before it can exit through said outlet.

The invention is illustrated, by way of example only, in the accompanying drawing, in which:

FIG. 1 is a vertical section through a filter provided with the device for decreasing deposits according to the invention;

FIG. 2 is a vertical section on a larger scale of said means;

FIGS. 3 and 4 show in plan the parts used in said device.

The filter illustrated in FIG. 1 is of the kind defined and comprises a housing 1 with inlet 2 and outlet 3, axially extending cylinder 4 of wire or plastic mesh or perforated metal, which may or may not include a liner in the form of a sleeve which is made of fibers so as to have fine pores, all as known per se, and an outlet 5 from the cylinder to which up to now a valve or tap was connected for flushing out or cleaning in any other manner the filter cylinder when it became clogged.

According to the invention, to outlet 5 a short connecting sleeve 6 is attached with one end, its other end leading into a housing comprised of two identical dish-shaped halves 7, 8 having annular flanges 9 at their open ends between which an annular gasket 10 is held.

The dish-shaped halves 7,8 correspond each to the shape and size of the cover 11 used to close the filter itself. However, it may be of any other suitable size. The halves 7,8 are held to each other by an annular clamp 12 closed by a hinged latch (not shown) known per se. Within the space formed by the dish-shaped halves of the housing a plurality of pressure-reducing plates 13 are provided. The plates have an outer diameter substantially equal to the inner diameter of the halves 7,8 so that they fit snugly within them.

The plates are provided with an elongated spiral groove 14 on one of their faces. Some plates 13 are provided with a through-going bore 16 near their periphery, while others 13' are provided with a through-going bore 15 near their center, the plates 13 and 13' being placed in alternate positions, starting with a plate 13 or 13' nearest the filter housing and having a plate 13 most remote from it.

If desired, grooves 14 may also be provided on both faces of the plates 13, 13'.

Small integral projecting pins (not shown) are provided in the back of the plates to cooperate with depressions (not shown) on the front of adjacent plates in order to position the plates relative each other to provide a continuous pressure reducing passage between the plates as can be seen by the arrows in FIG. 2, i.e., the communication between adjacent plates alternately by way of holes 15 and holes 16.

The liquid coming at full pressure from cylinder 4 through outlet 5 and sleeve 6 into dish-shaped half 7 will abut against the first plate 13' and press the stack of plates against dish-shaped half 8. The liquid carries with it solids some of which will flow through the aperture 15 of said plate 13' and from there through passage 14 through aperture 16 of the next plate 13 and so on, until is flows out in a trickle through the outlet 17 from dish-shaped half 8. The solids which are of larger size than the hole 16 will collect in the dish-shaped half 7 in the space between its end and the first plate 13. This space acts as a sump. A separate sump may be provided, if desired, between outlet 5 and sleeve 6.

The number of plates to be used depends on the desired pressure reduction of the liquid. The trickle flow can be utilized by attaching a pipe to outlet 17 and leading it to a desired location.

The pressure of the liquid flow can, of course, be reduced also by attaching a bleeder line or a cylinder in which a worm is disposed, or a hydro-cyclone or liquid-operated mechanical device such as a turbine, to the filter housing or by arranging one of these devices within the housing which will be adapted accordingly.

It has been found that with the device above described having 4 plates, the filter has to be cleaned for every 3000 cubic meter of water flow instead of for every 200 cubic meters passing through the filter under the same conditions of flow but without the device. The quality of the filtration is also considerably improved during the working cycle of this filter.

In the case of very dirty liquids it is advisable to shorten the filtration passage, i.e., to provide fewer plates 13,13' but to arrange a larger sump.

I claim:

1. In a filter for filtering solid contaminants from a liquid, including a housing having a contaminated liquid bottom inlet and a filtered liquid outlet, and filter means between said inlet and outlet for retaining the contaminants on one side thereof as the liquid passes through the filter means to the outlet, wherein the improvement in said filter comprises means, in combination therewith, for preventing the accumulation of solid contaminants on said filter means during filtration of said solid contaminants from said liquid comprising:

pressure reducing means containing sump means spaced from the top of said housing and communicating with said one side of said filter means, said pressure reducing means continuously discharging a portion of the liquid and solid contaminants from said housing at a pressure substantially less than the pressure in said housing, said pressure reducing means comprising at least one plate, said plate having a continuous groove on at least one face thereof, means for closing said groove to define a continuous liquid flow conduit, and aperture means extending through said plate and communicating said groove with said one side of said filter means, whereby the liquid must travel substantially the entire length of said groove before exiting therefrom, whereby solid contaminants are prevented from accumulating on said one side of said filter means.

2. In the filter of claim 1, comprising a plurality of said plates stacked on each other.

3. In the filter of claim 1, including a second housing separate from said first housing, an inlet and an outlet in said second housing, said plate being positioned in said second housing between said inlet and outlet, said inlet in said second housing communicating with said one side of said filter means.

4. In the filter of claim 1, including sump means between said plate and said one side of said filter means.

5. A method of preventing the accumulation of solid contaminants on a filter medium during operation of the filter medium, comprising the steps of:

continuously introducing a contaminated liquid through the base of a housing to one side of a filter medium and flowing the liquid through said filter medium while retaining the solid contaminants in the liquid on said one side of the medium, continuously removing a portion of the liquid introduced to said one side of the filter medium from said one side of the filter medium and solid contaminants which have been retained by said filter medium before said portion flows through the filter medium, and discharging said removed portion of the liquid and the solid contaminants retained by said filter medium through a pressure reducing means containing a sump means and a continuous grooved passage spaced from the top of said housing at a pressure substantially less than the pressure of the liquid at said one side of the filter medium, whereby the solid contaminants are prevented from accumulating on said one side of said filter medium.

* * * * *